H. W. CHENEY.
MOTOR DRIVEN COMPRESSOR.
APPLICATION FILED OCT. 30, 1919.

1,374,906.

Patented Apr. 19, 1921.

Inventor
H. W. Cheney
by
Attorney

UNITED STATES PATENT OFFICE.

HERBERT W. CHENEY, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

MOTOR-DRIVEN COMPRESSOR.

1,374,906.  Specification of Letters Patent.  Patented Apr. 19, 1921.

Application filed October 30, 1919. Serial No. 335,215.

*To all whom it may concern:*

Be it known that I, HERBERT W. CHENEY, a citizen of the United States of America, residing at Milwaukee, in the county of Milwaukee and State of Wisconsin, have invented a certain new and useful Improvement in Motor-Driven Compressors, of which the following is a specification.

This invention relates in general to improvements in the construction and mode of operation of fluid compressors, and relates specifically to an improved construction of motor driven air compressors.

An object of the invention is to provide a unit comprising a combined prime mover and fluid compressor, which is simple and compact in construction and efficient in operation.

It is desirable in motor-driven compressors of the type ordinarily employed to supply compressed air for the operation of air brakes, to have the unit as compact as possible and of minimum overall height. Compressors of this type when employed in connection with air brake systems for vehicles, are ordinarily mounted directly below the vehicle frame, thus making it desirable to have the compressor unit of minimum overall height in order to allow maximum clearance between the bottom of the compressor and the ground. In the prior units of this type which have reached the highest degree of commercial success, the compressor cylinders are horizontal and the motor is located with the axis of its shaft lying in a plane above that of the axes of the cylinders and of the compressor crank shaft. It will be obvious that such a construction will not produce a unit having minimum overall height and that minimum overall height can only be attained by placing the motor in such a position that the horizontal plane of its axis lies in the axial plane of the compressor cylinders and crank shaft.

A vital objection to so locating the motor in units having horizontally disposed compressor cylinders, has been that the compressor bearings wear relatively rapidly on the sides nearest to and farthest away from the compressor cylinders, thereby permitting movement of the crank shaft in a horizontal plane. It is customary in units of this type, due to the high motor speed, to provide a gear reduction consisting of a pinion secured directly to the motor shaft and meshing with a main gear rigidly secured to the end of the crank shaft. If the wear on the compressor bearings produces horizontal play of the crank shaft and hence of the main gear, it is impossible without providing special means, to maintain proper meshing of the gear and pinion.

The present invention contemplates the provision of means whereby the driving motor may be located in the horizontal plane of the axis of the compressor crank shaft and proper meshing of the gears maintained, irrespective of the occurrence of wear in the crank shaft bearings. With such a unit the overall height is reduced to a minimum and a compact structure is provided. This main object of eliminating the undesirable influence on the gearing, resulting from wear in the crank shaft bearings, is attained by providing fixed bearings for the transmission gearing and connecting the main gear with the crank shaft by means of a device which will permit proper driving of the crank shaft without affecting the meshing of the gears, regardless of wear on the crank shaft bearings.

The present invention further contemplates improvements in other details of construction and in the mode of operation of motor-driven compressors, whereby the efficiency thereof is enhanced, the cost of construction reduced to a minimum and all parts made readily accessible for inspection and repairs.

The term "motor" as employed throughout this specification is intended to designate any form of prime mover, the forms ordinarily employed being either an electric motor or an internal combustion engine. The term "compressor" as employed herein is intended to cover any form of fluid pressor.

A clear conception of an embodiment of the invention and of the method of operation of a device constructed in accordance therewith, may be had by referring to the drawing accompanying and forming a part of this specification in which like reference characters designate the same or similar parts in the various views.

Figure 1:
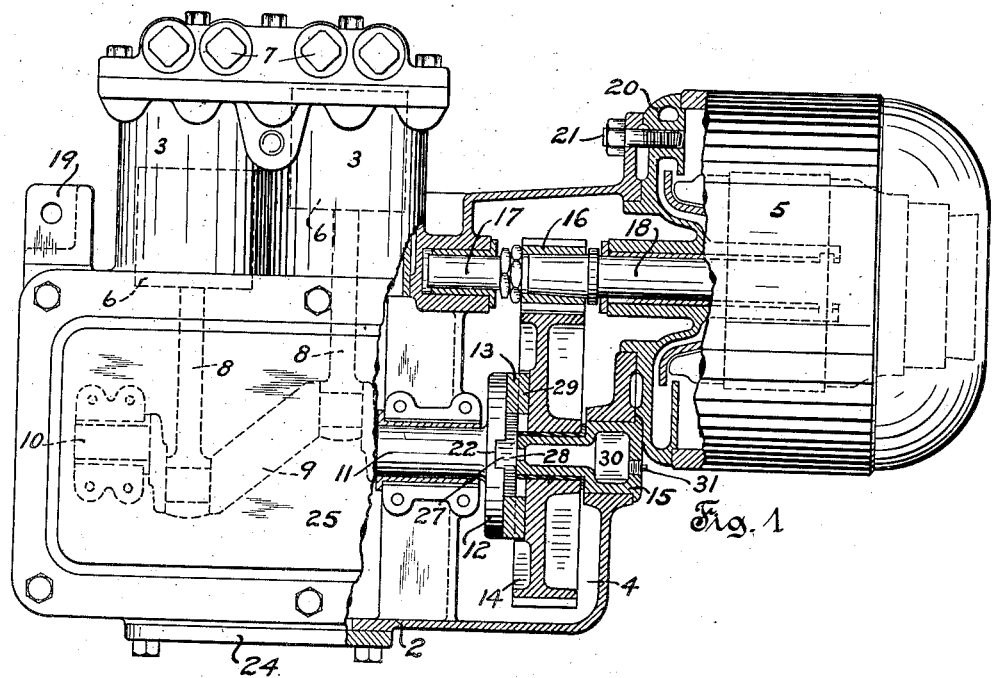
Figure 1 is a plan view partly in section, of an electric motor-driven air compressor, the section being taken along a horizontal plane passing through the axes of the motor and crank shafts.

The motor-driven compressor unit comprises in general a prime mover such as an electric motor 5, a single acting air compressor having a crank casing 2 and a pair of parallel horizontal cylinders 3, and transmission gearing connecting the motor with the movable compressor elements. The motor 5 is of ordinary construction comprising the usual frame and a rotor which is secured to the motor shaft 18 mounted in a bearing element 20. The driving pinion 16 is secured to the motor shaft 18 adjacent an end of the bearing in the element 20. The end of the shaft 18 on the side of the pinion 16 remote from the motor 5 is provided with a bearing portion 17, thus providing alined bearings for the shaft 18 on opposite sides of the pinion 16. The motor bearing element 20 is rigidly detachably secured to the end of the compressor crank casing 2 by means of nuts and studs 21. The main gear 14 which meshes with the pinion 16 is mounted upon a bearing element or stud 15 which is also rigidly detachably secured to the crank casing 2 of the compressor by means of cap screws 34.

Figures 3, 4:
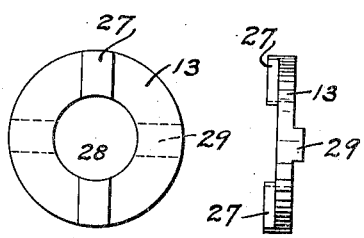
Fig. 3 is a front elevation of the coupling block which connects the main gear and the crank shaft.
Fig. 4 is a side elevation of the coupling block which connects the main gear and the crank shaft.

The movable structure of the compressor comprises a pair of reciprocable pistons 6 movable within the cylinders 3 and connected with the crank shaft 9 by means of connecting rods 8. The pistons 6 are adapted to compress air within the cylinders 3, the inflow and exit of the air being controlled by the usual valves 7. The crank shaft 9 is located within the crank chamber 4 and is mounted in bearings 10, 11 rigidly secured to the crank casing 2. The end of the crank shaft 9 adjacent the gear 14 is provided with an enlargement forming a flange 12. The flange 12 is provided with a transverse recess 22 crossing the crank shaft axis and coacting with alined transverse projections 27, formed on the connecting block 13. The opposite side of the connecting block 13 is provided with alined transverse projections 29 extending at right angles to the projections 27, these latter projections 29 coacting with a transverse recess in the side of the main gear 14. The block 13 is of ring form being provided with a central through opening 28, see Figs. 3 and 4.

Figure 2:
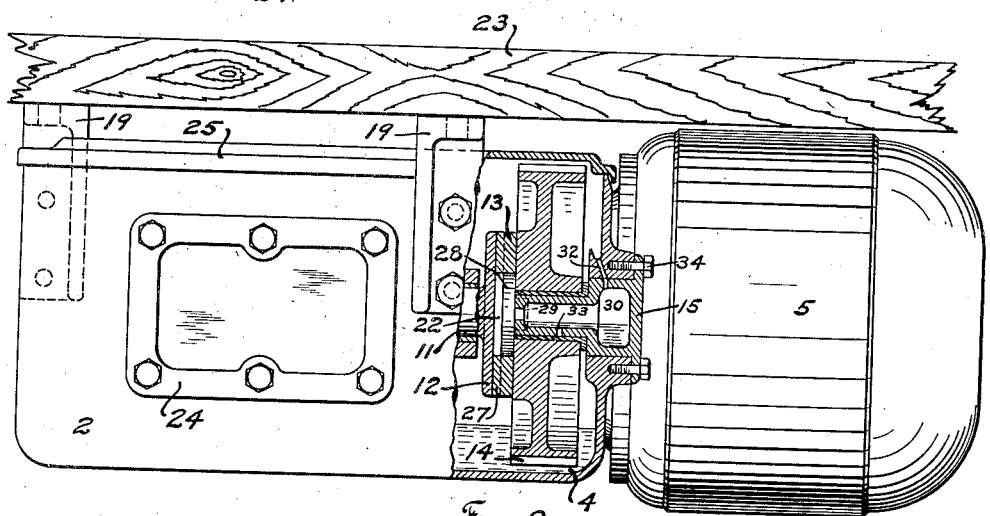
Fig. 2 is a side elevation partly in section, of an electric motor-driven air compressor, the section being taken along a vertical plane passing through the axis of the crank shaft.

Access to the interior of the crank casing 2 is permitted by means of a removable top cover plate 25 and a side inspection plate 24. The interior of the crank chamber 4 is ordinarily provided with a bath of lubricant within which the main gear 14 projects. The interior of the bearing element or stud 15 is provided with a chamber 30 to which lubricant is supplied through an oil duct 32 and from which the lubricant is delivered to the bearing portions of the block 13 and to the main gear bearing through oil ducts 33. Lubricant may be admitted to the chamber 30 through an opening in the bearing element or stud 15 which is ordinarily closed by means of a screw plug 31. The compressor unit is provided with suspension lugs 19 by means of which the unit may be suspended from an overhead beam 23 as disclosed in Fig. 2.

During the normal operation of the unit the motor 5 is operated and its rotary motion is transmitted through the pinion 16 to the main gear 14. The rotation of the main gear 14 is transmitted through the lugs 29, block 13 and lugs 27 to the crank shaft 9. The rotating crank shaft 9 acting through the connecting rods 8, causes the pistons 6 to reciprocate within the cylinders 3 and to alternately draw in and compress the air within the cylinders 3. During the rotation of the main gear 14, lubricant is carried to the top of the crank chamber 4 and flows downwardly through the duct 32 and over the adjacent elements thereby maintaining proper lubrication of the various bearing surfaces. The bearings for the motor shaft 18 are also thus lubricated, the pinion squeezing the entrained lubricant from the gear 14 and thus providing a flood of lubricant for the motor shaft bearings.

It will be noted that due to the variations in pressure on the pistons 6, the portions of the crank shaft bearings 10, 11 nearest to and farthest from the cylinders 3 will be subjected to alternate variations in pressure and will naturally wear due to such variations in pressure thereon. This wear on the bearings 10, 11 will cause the crank shaft to move a slight amount in a horizontal plane. The block 13 with its transverse lugs 27, 29 coacting with the recesses in crank shaft 9 and the main gear 14 respectively, and located at right angles to each other, permits such motion of the crank shaft without affecting the position of the gear 14. This block provides substantially a universal driving connection between the crank shaft and the gear. The gear 14 being mounted upon the rigid bearing element or stud 15 will always mesh properly with the pinion 16 secured to the motor shaft 18 which also has rigid bearings.

If it is desired to remove the main gear 14, it is necessary to first remove the motor 5 together with its shaft 18 and the pinion 16, such removal being effected by removing the nuts from the studs 21. The bearing element or stud 15 may then be removed after which the gear 14 may be freely removed through the upper opening of the crank casing 2 which is normally closed by the cover plate 25. In order to remove the crank shaft 9 it is necessary only to remove the cover plate 25 and the crank shaft bearing caps. This feature permits replacement of the crank shaft bearing shells without necessitating removal of the motor or of the transmission gearing between the motor and the compressor. The transmission gearing between the motor and the compressor may be either spur gearing or so-called spiral gearing wherein the teeth are formed as helices.

It will be obvious that the structure disclosed will readily attain the objects which it is sought to attain and will produce a compressor unit of minimum overall height and maximum efficiency.

It should be understood that it is not desired to limit the invention claimed to the exact details of construction herein shown and described, for obvious modifications may occur to persons skilled in the art.

It is claimed and desired to secure by Letters Patent:

1. In combination, a motor having a shaft rotatable at high speed, a compressor having a shaft rotatable at relatively low speed and a driving connection between said shafts, said connection being rotatable at the speed of said compressor shaft permitting relative transverse movement of said shafts.

2. In combination, a motor having a shaft rotatable at high speed, a compressor having a shaft rotatable at relatively low speed, reduction gearing associated with said high speed shaft, and a universal connection between said gearing and the low speed shaft.

3. In combination, a motor having a shaft rotatable at high speed, a compressor having a shaft rotatable at relatively low speed, reduction gearing associated with said motor shaft, and a universal connection between said gearing and said compressor shaft.

4. In combination, a compressor having a low speed shaft and a cylinder lying in a common plane, a motor having a high speed shaft lying in said plane, and a connection between said shafts, said connection being operable at the speed of said compressor shaft and permitting relative transverse movement of said shafts in said plane.

5. In combination, a compressor having a low speed shaft and a cylinder lying in a common plane, a motor having a high speed shaft lying in said plane, gearing associated with one of said shafts, and a connection between said gearing and the other of said shafts, said connection being operable at the speed of said compressor shaft and permitting relative transverse movement of said shafts in said plane.

6. In combination, a compressor having a low speed shaft and a cylinder lying in a common plane, a motor having a high speed shaft lying in said plane, gearing associated with said motor shaft, and a connection between said gearing and said compressor shaft, said connection permitting relative transverse movement of said shafts in said plane.

7. In combination, a motor having a shaft rotatable at high speed, a compressor having a shaft rotatable at relatively low speed, a pinion secured to said motor shaft, a gear coacting with said pinion and mounted in substantial alinement with said compressor shaft, and a driving block between said gear and said compressor shaft permitting relative transverse movement of said compressor shaft and said gear.

8. In combination, a compressor having a low speed shaft and a cylinder lying in a common plane, a motor having a high speed shaft lying in said plane, a pinion secured to said motor shaft, a gear meshing with said pinion and mounted in substantial alinement with said compressor shaft, and a driving block connecting said gear and said compressor shaft and permitting motion of said compressor shaft in said plane transversely relative to said motor shaft.

9. In combination, a compressor having a shaft and a cylinder lying in a common plane, a motor located adjacent said cylinder and having a shaft lying in said plane, gearing associated with said motor shaft, and a driving connection between said gearing and said compressor shaft, said connection permitting motion of said compressor shaft in said plane transversely relative to said motor shaft.

10. In combination, a compressor having a crank shaft, a casing inclosing said crank shaft, a bearing stud secured to said casing in substantial alinement with said crank shaft, a gear mounted on said stud and operatively associated with said crank shaft, and means for driving said gear.

11. In combination, a compressor having a crank shaft, a casing inclosing said crank shaft, a bearing stud secured to said crank casing in substantial alinement with said crank shaft, a gear mounted upon said stud and operatively associated with said crank shaft, a bearing secured to said crank casing, a pinion associated with said bearing and meshing with said gear, and means for driving said pinion.

12. In combination, a compressor having a crank shaft, a casing inclosing said crank shaft, a hollow bearing stud secured to said crank casing in substantial alinement with said crank shaft, a gear mounted upon said stud, means for admitting lubricant to the interior of said stud and from said interior to the wearing surfaces of said stud, and a connection between said gear and said crank shaft.

13. In combination, a motor having a shaft, a compressor having a shaft, reduction gearing associated with one of said shafts and spaced from the end of the other of said shafts, and a universal connection located between said gearing and said end of said other shaft.

14. In combination, a motor having a shaft, a compressor having a shaft, reduction gearing associated with said motor shaft and spaced from the end of said compressor shaft, and a universal connection located between said gearing and said end of said compressor shaft.

In testimony whereof the signature of the inventor is affixed hereto.

HERBERT W. CHENEY.